United States Patent
Hsu et al.

(10) Patent No.: US 12,330,157 B2
(45) Date of Patent: Jun. 17, 2025

(54) OPTOELECTRONIC TWEEZER DEVICE AND FABRICATION METHOD THEREOF

(71) Applicant: Au Optronics Corporation, Hsinchu (TW)

(72) Inventors: Shih-Hua Hsu, Hsinchu (TW); Wei-Han Chen, Hsinchu (TW); Ching-Wen Chen, Hsinchu (TW); Ying-Hui Lai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 526 days.

(21) Appl. No.: 17/750,399

(22) Filed: May 23, 2022

(65) Prior Publication Data
US 2023/0234055 A1 Jul. 27, 2023

(30) Foreign Application Priority Data
Jan. 25, 2022 (TW) .................. 111103180

(51) Int. Cl.
*B01L 3/00* (2006.01)
*B03C 5/02* (2006.01)
*G01N 15/1434* (2024.01)

(52) U.S. Cl.
CPC ... *B01L 3/502761* (2013.01); *B01L 3/502707* (2013.01); *B03C 5/026* (2013.01); *G01N 15/1434* (2013.01); *B01L 2200/0668* (2013.01); *B01L 2300/12* (2013.01); *B01L 2400/0454* (2013.01)

(58) Field of Classification Search
USPC ....................................... 250/251
See application file for complete search history.

(56) References Cited

U.S. PATENT DOCUMENTS

| | | | |
|---|---|---|---|
| 10,465,154 B2 | 11/2019 | Yang et al. | |
| 10,953,408 B2 | 3/2021 | Wheeler et al. | |
| 11,162,060 B2 | 11/2021 | Yang et al. | |
| 11,581,694 B1* | 2/2023 | Choi | H10H 20/8142 |
| 2010/0101960 A1 | 4/2010 | Ohta et al. | |
| 2017/0226453 A1 | 8/2017 | Yang et al. | |
| 2020/0140798 A1 | 5/2020 | Yang et al. | |

FOREIGN PATENT DOCUMENTS

CN 107250344 1/2021

OTHER PUBLICATIONS

Yajia Yang et al., "Self-Locking Optoelectronic Tweezers for Single-Cell and Microparticle Manipulation across a Large Area in High Conductivity Media", Scientific Reports, Mar. 4, 2016, pp. 1-8.

* cited by examiner

*Primary Examiner* — Kiet T Nguyen
(74) *Attorney, Agent, or Firm* — JCIPRNET (57) ABSTRACT

An optoelectronic tweezer device includes a transparent substrate, a semiconductor layer, a first electrode and a dielectric layer. The semiconductor layer is located above the transparent substrate and includes a first doping region, a second doping region and a transition region, wherein the transition region is located between the first doping region and the second doping region. The first electrode is located on the first doping region and is electrically connected to the first doping region. The dielectric layer is located above the semiconductor layer and has a first through hole overlapping the first electrode.

10 Claims, 14 Drawing Sheets

OPTOELECTRONIC TWEEZER DEVICE AND FABRICATION METHOD THEREOF

CROSS-REFERENCE TO RELATED APPLICATION

This application claims the priority benefit of Taiwan application serial no. 111103180, filed on Jan. 25, 2022. The entirety of the above-mentioned patent application is hereby incorporated by reference herein and made a part of this specification.

BACKGROUND OF THE INVENTION

1. Field of the Invention

The invention relates to an optical tweezer device and fabrication method thereof.

2. Description of Related Art

Optical tweezer is a tool for operating tiny particles such as semiconductor particles, metal particles, metal nanowires, biological cells or other particles. In general, the operation of optical tweezer can be performed by a highly focused laser beam. Nanoscale or microscale dielectric particles can be operated by the force generated by the laser beam. Optical tweezer operates in a non-mechanical contact manner, and the damage to the particles to be clamped by the optical tweezer can be reduced by selecting a suitable wavelength of laser light. Therefore, there are many biotechnological studies using the optical tweezer to operate single cells.

SUMMARY OF THE INVENTION

The present invention provides an optical tweezer device, which can reduce the cost of the manufacturing process.

The invention provides a manufacturing method of an optical tweezer device, which can reduce the production cost of the optical tweezer device.

At least one embodiment of the present invention provides an optical tweezer device including a transparent substrate, a semiconductor layer, a first electrode and a dielectric layer. The semiconductor layer is located above the transparent substrate and includes a first doping region, a second doping region and a transition region, wherein the transition region is located between the first doping region and the second doping region. The first electrode is located on the first doping region and is electrically connected to the first doping region. The dielectric layer is located on the semiconductor layer and has a first through hole overlapping the first electrode.

At least one embodiment of the present invention provides a method for manufacturing an optical tweezer device, including: forming a semiconductor material layer above a transparent substrate; performing a plurality of doping processes on the semiconductor material layer to form a semiconductor layer including a first doping region, a second doping region and a transition region, wherein the transition region is located between the first doping region and the second doping region; forming a first electrode on the first doping region; and forming a dielectric layer over the semiconductor layer, the dielectric layer has a first through hole overlapping the first electrode.

Based on the above, since the semiconductor layer is located on the transparent substrate, the semiconductor layer can be formed by a thin film process, thereby reducing the production cost of the optical tweezer device.

BRIEF DESCRIPTION OF THE DRAWINGS

FIG. 3A to FIG. 9A, FIG. 10, FIG. 11 and FIG. 12 are schematic cross-sectional views of a method for manufacturing an optical tweezer device according to an embodiment of the present invention.

FIG. 3B to 9B are schematic top views of the structures of FIG. 3A to FIG. 9A.

DESCRIPTION OF THE EMBODIMENTS

Figure 1A:
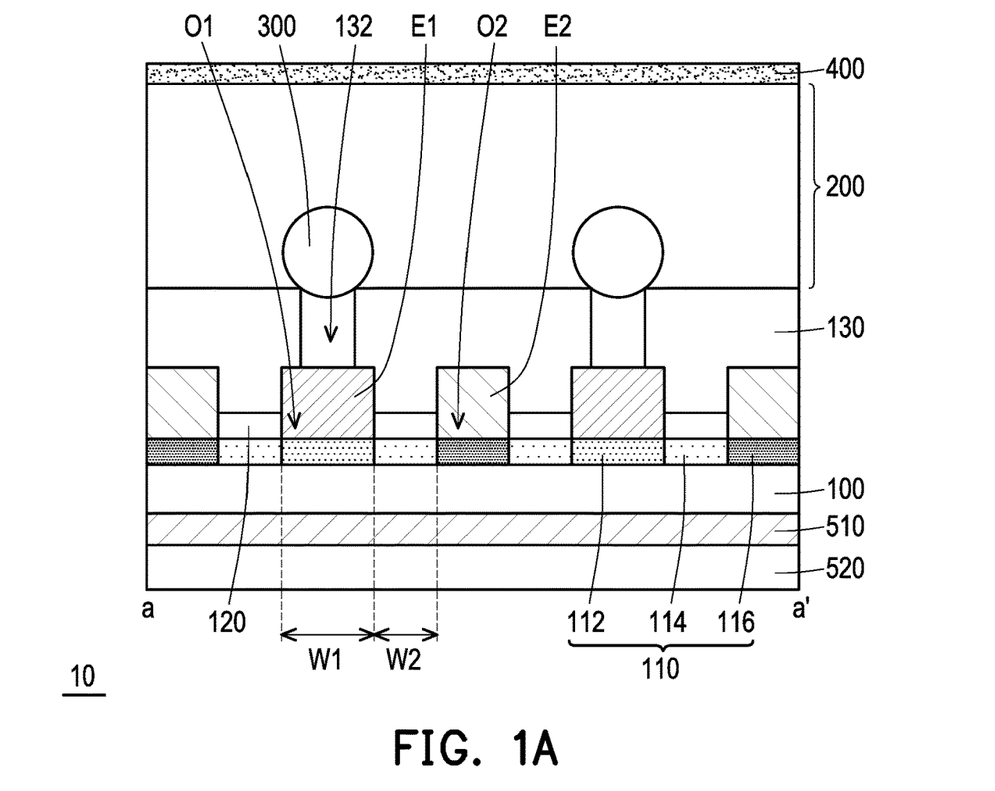
FIG. 1A is a schematic cross-sectional view of an optical tweezer device according to an embodiment of the present invention.
Figure 1B:
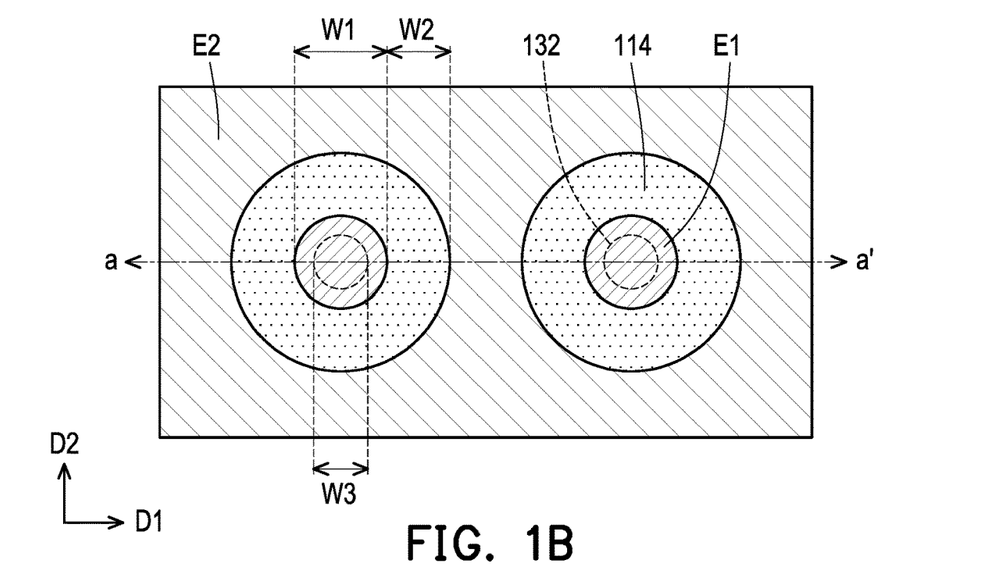
FIG. 1B is a schematic top view of the optical tweezer device of FIG. 1A.

FIG. 1A is a schematic cross-sectional view of an optical tweezer device according to an embodiment of the present invention. FIG. 1B is a schematic top view of the optical tweezer device of FIG. 1A, wherein FIG. 1A corresponds to the position of the line a-a' in FIG. 1B. FIG. 1B shows the first electrodes E1, the second electrode E2, the transition region 114 of the semiconductor layer 110 and the first through hole 132 of the dielectric layer 130, and other components are omitted in FIG. 1B.

Referring to FIG. 1A and FIG. 1B, the optical tweezer device 10 includes a transparent substrate 100, a semiconductor layer 110, first electrodes E1 and a dielectric layer 130. In this embodiment, the optical tweezer device 10 further includes a second electrode E2, an insulation layer 120, a buffer solution 200, a plurality of particles 300, a counter electrode 400, a reflective layer 510 and a protection layer 520. In some embodiments, the optical tweezer device 10 is a Self locking optical tweezer (SLOT) device.

The material of the transparent substrate 100 includes, for example, glass, quartz, organic polymer or other suitable materials. Compared with using a silicon wafer as the substrate, the use of the transparent substrate 100 can reduce the production cost of the optical tweezer device 10.

The semiconductor layer 110 is located above the transparent substrate 100. In some embodiments, the material of the semiconductor layer 110 includes, for example, polysilicon, amorphous silicon, single crystal silicon or other suitable materials. The semiconductor layer 110 includes first doping regions 112, second doping region 116 and transition regions 114, wherein the transition regions 114 are located between the first doping regions 112 and the second doping region 116.

The first doping regions 112 are separated from each other. In some embodiments, the first doping regions 112 are arrayed on the transparent substrate 100, for example, the vertical projection of a first doping region 112 on the transparent substrate 100 is a circle, an ellipse, a triangle, a rectangle, pentagon, hexagon or other geometric shapes, and the first doping regions 112 are arrayed on the transparent substrate 100 along the first direction D1 and the second direction D2. FIG. 1A shows two first doping regions 112 in the optical tweezer device 10, but the number of the first doping regions 112 can be adjusted according to actual needs. In some embodiments, the width W1 of the first doping region 112 is 2 μm to 100 μm.

The transition regions 114 are separated from each other, and each transition region 114 surrounds a corresponding one of the first doping regions 112. In some embodiments, the transition region 114 and the first doping region 112 are concentric circles, but the invention is not limited thereto. In other embodiments, the first doping region 112 may include shapes other than circular, and the shape of the transition region 114 varies with the shape of the first doping region 112. In some embodiments, the width W2 of the transition region 114 is 2 μm to 20 μm.

The second doping region 116 surrounds the plurality of transition regions 114. In this embodiment, the second doping region 116 is a continuous structure, and the transition regions 114 and the first doping regions 112 are distributed in the second doping region 116.

In some embodiments, one of the first doping region 112 and the second doping region 116 is a P-type semiconductor, and the other of the first doping region 112 and the second doping region 116 is an N-type semiconductor, and the transition region 114 is an intrinsic semiconductor or a lightly doped semiconductor which has a purity close to the intrinsic semiconductor. Therefore, the semiconductor layer 110 includes a plurality of PIN diodes consisting of the first doping regions 112, the transition regions 114 and the second doping region 116.

The insulation layer 120 is located on the semiconductor layer 110. The insulation layer 120 has a plurality of openings O1 and O2 overlapping the semiconductor layer 110. The openings O1 overlap the first doping regions 112, and the opening O2 overlap the second doping region 116. In some embodiments, the sidewalls of the openings O1 are substantially aligned with the boundary of the first doping regions 112, but the invention is not limited thereto. In other embodiments, the sidewalls of the openings O1 are deviated from the boundary of the first doping regions 112. The material of the insulation layer 120 includes, for example, silicon oxide, silicon nitride, silicon oxynitride or other suitable materials.

In some embodiments, the first electrodes E1 are arrayed on the semiconductor layer 110 along the first direction D1 and the second direction D2, but the invention is not limited thereto. In other embodiments, the first electrodes E1 are arrayed on the semiconductor layer 110 in other arrangements. The first electrodes E1 are located on the first doping regions 112 and are electrically connected to the first doping regions 112. In this embodiment, the first electrodes E1 is directly formed on the first doping regions 112. In this embodiment, the first electrodes E1 are island-shaped structures, and each of the first electrodes E1 overlaps a corresponding one of the first doping regions 112. In some embodiments, the sidewalls of the first electrodes E1 are substantially aligned with the boundary of the first doping regions 112, but the invention is not limited thereto. In other embodiments, the sidewalls of the first electrodes E1 deviate from the boundary of the first doping regions 112.

The second electrode E2 is located on the second doping region 116 and is electrically connected to the second doping region 116. In this embodiment, the second electrode E2 is directly formed on the second doping region 116. In this embodiment, the second electrode E2 is a continuous structure, and the second electrode E2 surrounds the island-shaped first electrodes E1. In some embodiments, the sidewalls of the second electrodes E2 are substantially aligned with the boundary of the second doping region 116, but the invention is not limited thereto. In other embodiments, the sidewalls of the second electrode E2 deviate from the boundary of the second doping region 116.

The first electrode E1 may have a single-layer or multi-layer structure. The material of the first electrodes E1 include metal, metal oxide, metal nitride or other suitable materials. The second electrode E2 may have a single-layer or multi-layer structure. The material of the second electrode E2 includes metal, metal oxide, metal nitride or other suitable materials. In some embodiments, the first electrodes E1 and the second electrode E2 belong to the same conductive layer. In other words, the first electrodes E1 and the second electrode E2 are formed by patterning the same conductive material layer. In some embodiments, the first electrodes E1 and the second electrode E2 include the same thickness and the same material.

The dielectric layer 130 is located above the semiconductor layer 110. In this embodiment, the dielectric layer 130 is formed on the first electrodes E1, the second electrode E2 and the insulation layer 120, and part of the first electrodes E1, the second electrode E2 and the insulation layer 120 are located between the semiconductor layer 110 and the dielectric layer 130. The dielectric layer 130 covers the top surface of the second electrode E2. The dielectric layer 130 has first through holes 132 overlapping the first electrodes E1. In some embodiments, the material of the dielectric layer 130 includes silicon oxide, silicon nitride, silicon oxynitride, organic materials or other suitable materials.

The first through holes 132 expose at least part of the top surface of the first electrodes E1. In this embodiment, the dielectric layer 130 has a plurality of first through holes 132 arranged in an array, and each of the first through holes 132 overlaps with a corresponding one of the first electrodes E1. In some embodiments, the width W3 of the first through hole 132 is 2 μm to 100 μm.

The reflective layer 510 is located on the side of the transparent substrate 100 facing away from the semiconductor layer 110. The transparent substrate 100 is located between the reflective layer 510 and the semiconductor layer 110. In some embodiments, the reflective layer 510 includes metal or other reflective material. The protection layer 520 covers the reflective layer 510.

The counter electrode 400 overlaps the plurality of first electrodes E1. In some embodiments, the counter electrode 400 includes a material that can transmit light, such as indium tin oxide, indium zinc oxide, aluminum tin oxide, aluminum zinc oxide, indium gallium zinc oxide, organic conductive material, or other suitable material or stacked layers of the above materials.

The buffer solution 200 is located between the counter electrode 400 and the first electrodes E1. The buffer solution 200 is located between the counter electrode 400 and the dielectric layer 130. In some embodiments, the buffer solution 200 fills the first through holes 132 of the dielectric layer 130, and the buffer solution 200 is in contact with the counter electrode 400, the first electrodes E1 and the dielectric layer 130. In some embodiments, the buffer solution 200 is, for example, a physiological buffer solution or other buffer solution (e.g., an isotonic buffer solution). A plurality of particles 300 are located in the buffer solution 200. The particles 300 may be biological particles, organic particles, or inorganic particles. The particle size of the particles 300 is 2 μm to 100 μm.

In some embodiments, alternating current is applied to the counter electrode 400 and the first electrodes E1 at a frequency to generate an electric field between the counter electrode 400 and the first electrodes E1. The induced polarized particles 300 are attracted to the first through holes 132 of the dielectric layer 130 overlapping the first electrodes E1 due to the dielectrophoretic force.

Figure 2:
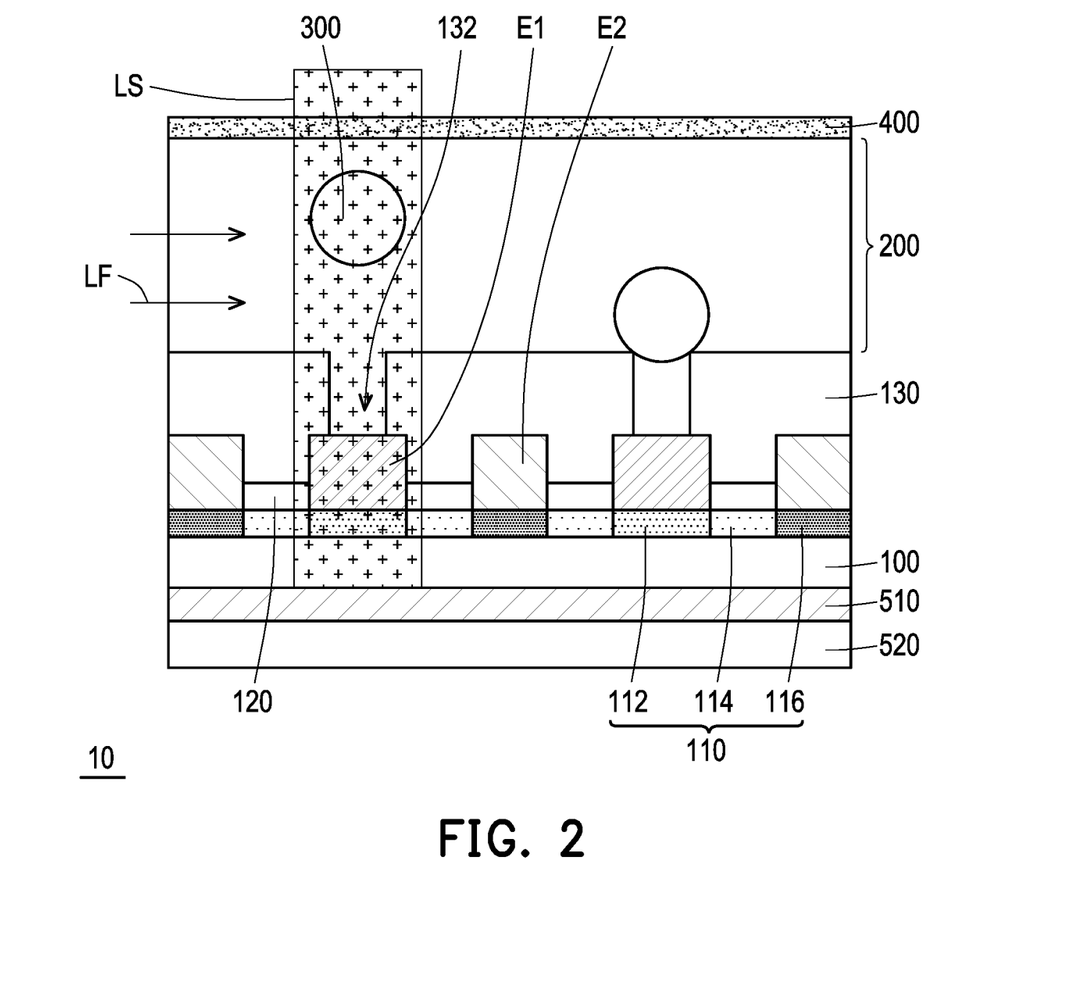
FIG. 2 is a schematic cross-sectional view of an optical tweezer device according to an embodiment of the present invention.

Referring to FIG. 2, a desired induced polarized particle 300 are selected, and the position of the selected induced polarized particle 300 (or the position of the semiconductor layer 110 under the selected induced polarized particle 300) is irradiated with the light beam LS. In some embodiments, the diameter of the light beam LS is larger than the width of the first electrode E1, and the light beam LS not only irradiates the induced polarized particle 300, but also irradiates the PIN diode under the selected first electrode E1. The diameter of the light beam LS is 2 μm to 120 μm. For example, the light beam LS irradiates the transition region 114, causing the PIN diode below the selected induced polarized particle 300 to generate a photocurrent, and reverses the direction of the dielectrophoretic force of the selected induced polarized particle 300, so that the selected induced polarized particle 300 is repelled and exits the first through hole 132 of the dielectric layer 130. In some embodiments, the buffer solution 200 flows along the flow direction LF, and thus, the induced polarized particle 300 exiting the first through hole 132 flows downstream along the buffer solution 200. In some embodiments, the induced polarized particle 300 flowing downstream are collected and analysed, but the invention is not limited thereto. In other embodiments, the induced polarized particles 300 retained on the first through holes 132 are collected and analysed.

In some embodiments, the light beam LS includes laser, ultraviolet light, visible light, or other suitable light.

In some embodiments, since the optical tweezer device 10 includes the reflective layer 510, the light beam LS passing through the transparent substrate 100 can be reflected by the reflective layer 510 and return to the semiconductor layer 110, so the semiconductor layer 110 can generate larger photocurrent. In some embodiments, the ratio of photocurrent to dark current generated by the semiconductor layer 110 is greater than or equal to two orders of magnitude.

The doping type of the semiconductor layer 110 will influence the direction of the current generated after the PIN diode is irradiated. In this embodiment, the first doping region 112 is an N-type semiconductor, the second doping region 116 is a P-type semiconductor, and the surfaces of the induced polarized particles 300 are negatively charged. In other embodiments, the first doping region 112 is a P-type semiconductor, the second doping region 116 is an N-type semiconductor, and the surfaces of the induced polarized particles 300 are positively charged.

FIG. 3A to FIG. 9A, FIG. 10, FIG. 11 and FIG. 12 are schematic cross-sectional views of a method for manufacturing an optical tweezer device according to an embodiment of the present invention. FIG. 3B to FIG. 9B are schematic top views of the structures of FIG. 3A to FIG. 9A. It should be noted herein that, in embodiments provided in FIG. 3A to FIG. 9A, FIG. 10, FIG. 11 and FIG. 12, element numerals and partial content of the embodiments provided in FIG. 1A, FIG. 1B and FIG. 2 are followed, the same or similar reference numerals being used to represent the same or similar elements, and description of the same technical content being omitted. For a description of an omitted part, reference may be made to the foregoing embodiment, and the descriptions thereof are omitted herein.

Figure 3A:
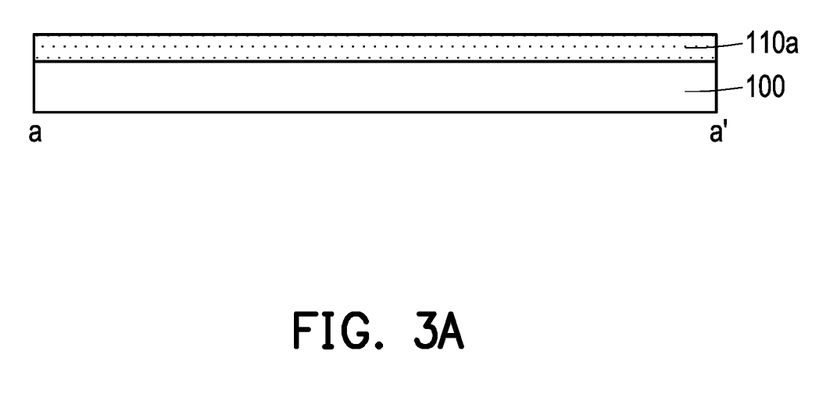
Figure 3B:
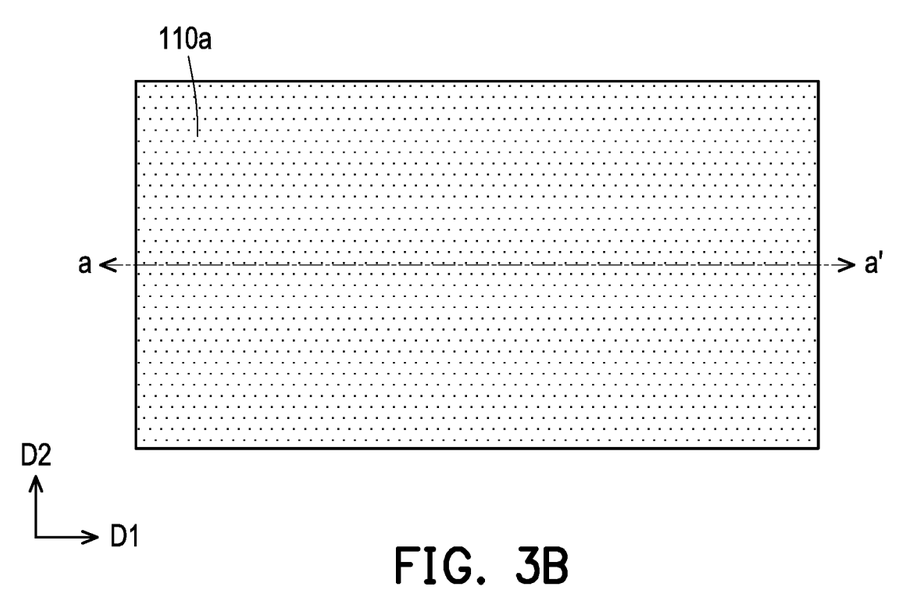

Referring to FIG. 3A and FIG. 3B, a semiconductor material layer 110a is formed above the transparent substrate 100. In this embodiment, since the semiconductor material layer 110a is located above the transparent substrate 100, the semiconductor material layer 110a can be formed by a thin film process, thereby reducing the production cost of the optical tweezer device. In some embodiments, the method for forming the semiconductor material layer 110a includes, for example, a low temperature poly-silicon (LIPS) process or other suitable processes. In addition, compared with fabricating the optical tweezer device on a wafer, a large-area optical tweezer device can be easily obtained by using the thin film process.

Referring to FIG. 4A to FIG. 5A and FIG. 4B to FIG. 5B, multiple doping processes are performed on the semiconductor material layer 110a to form the semiconductor layer 110 including the first doping regions 112, the second doping region 116 and the transition regions 114, wherein the transition regions 114 are located between the first doping regions 112 and the second doping region 116.

Figure 4A:
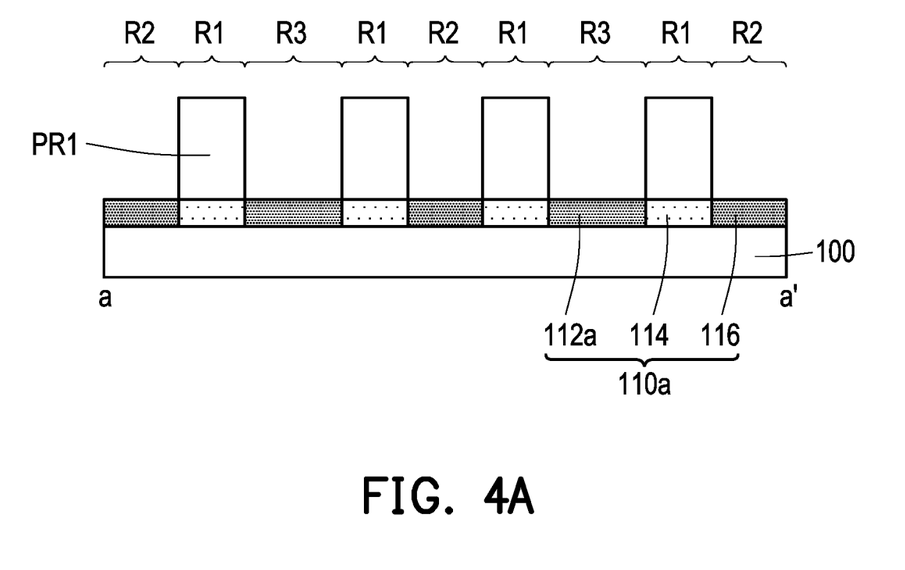
Figure 4B:
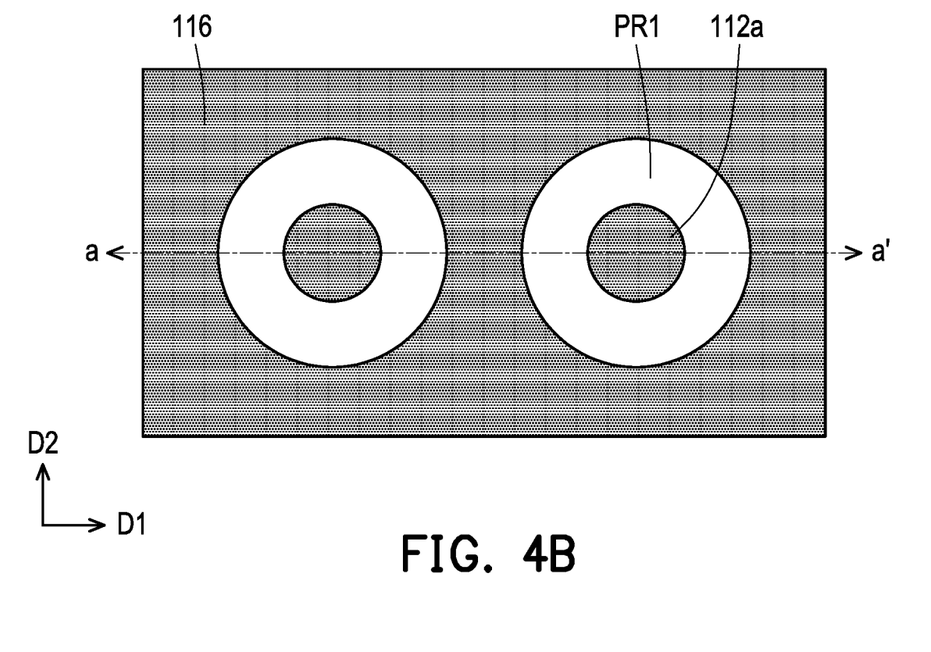

Referring to FIG. 4A and FIG. 4B, a first mask pattern PR1 is formed above the first regions R1 of the semiconductor material layer 110a, and the first mask pattern PR1 exposes the second region R2 and the third regions R3 of the semiconductor material layer 110a, the first regions R1 surround the third regions R3, and the first regions R1 are located between the second region R2 and the third regions R3. In some embodiments, the first mask pattern PR1 is, for example, a patterned photoresist.

Using the first mask pattern PR1 as a mask, a first doping process is performed on the second region R2 and the third regions R3 of the semiconductor material layer 110a to form the semiconductor material layer 110a. The first doping process is, for example, a P-type doping or an N-type doping. In this embodiment, the first doping process is a P-type doping process. In this embodiment, the first doping process forms the second doping region 116 and the first doping region 112a with the same doping type in the second region R2 and the third region R3.

After the first doping process is performed, the first mask pattern PR1 is removed. In some embodiments, the first mask pattern PR1 is removed by etching (e.g., ashing).

Figure 5A:
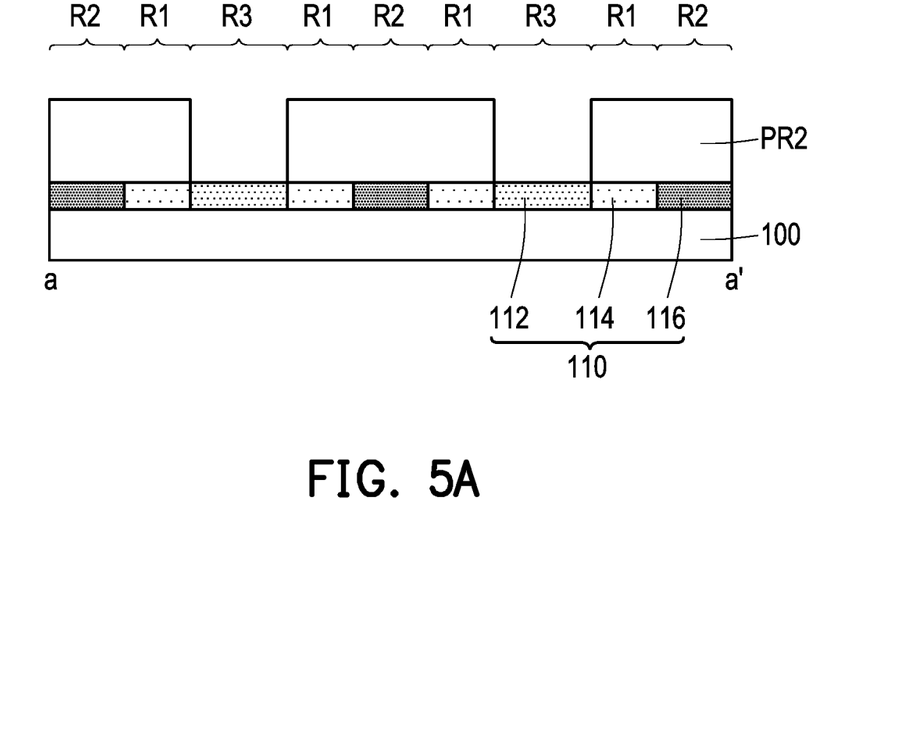
Figure 5B:
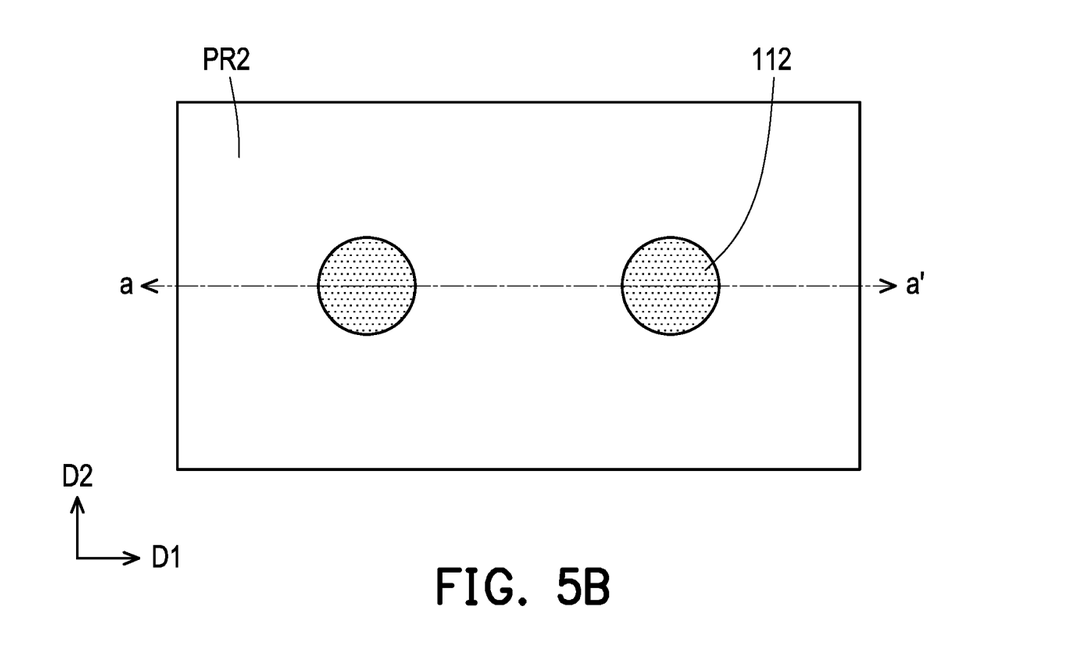

Referring to FIG. 5A and FIG. 5B, a second mask pattern PR2 is formed above the first regions R1 and the second region R2 of the semiconductor material layer 110a, and the second mask pattern PR2 exposes the third regions R3 of the semiconductor material layer 110a. In some embodiments, the second mask pattern PR2 is, for example, a patterned photoresist.

Using the second mask pattern PR2 as a mask, a second doping process is performed on the third region R3 of the semiconductor material layer 110a. The second doping process is, for example, a P-type doping or an N-type doping. In this embodiment, the second doping process is different from the first doping process, and the second doping process is an N-type doping process. In this embodiment, the second doping process forms the first doping regions 112 in the third regions R3.

So far, the semiconductor layer 110 including the first doping regions 112, the second doping region 116 and the transition regions 114 is substantially completed, the third regions R3 of the semiconductor material layer 110a corresponds to the position of the first doping regions 112, the second region R2 of the semiconductor material layer 110a corresponds to the position of the second doping region 116, and the first regions R1 of the semiconductor material layer 110a corresponds to the position of the transition regions 114.

After performing the second doping process, the second mask pattern PR2 is removed. In some embodiments, the second mask pattern PR2 is removed by etching (e.g., ashing).

Figure 6A:
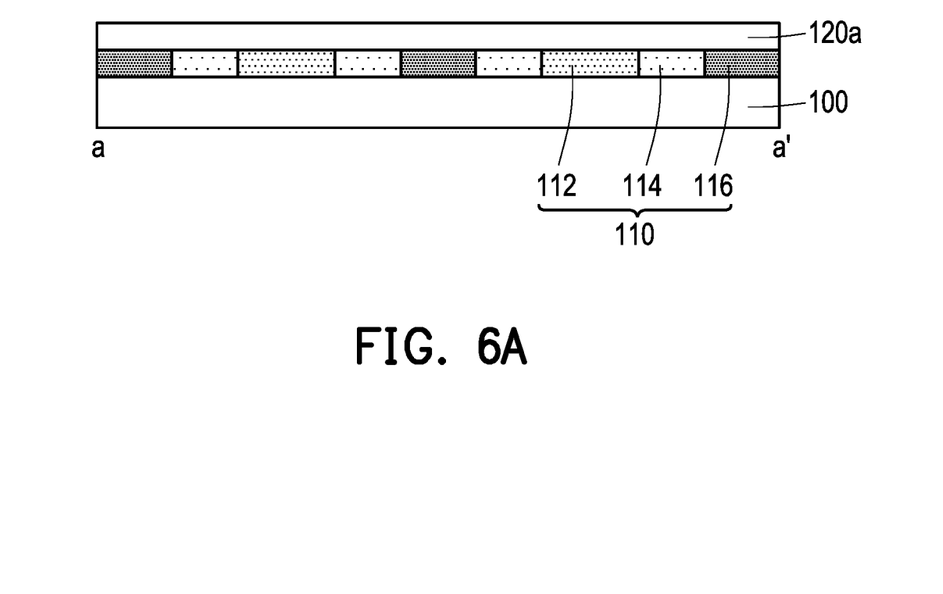
Figure 6B:
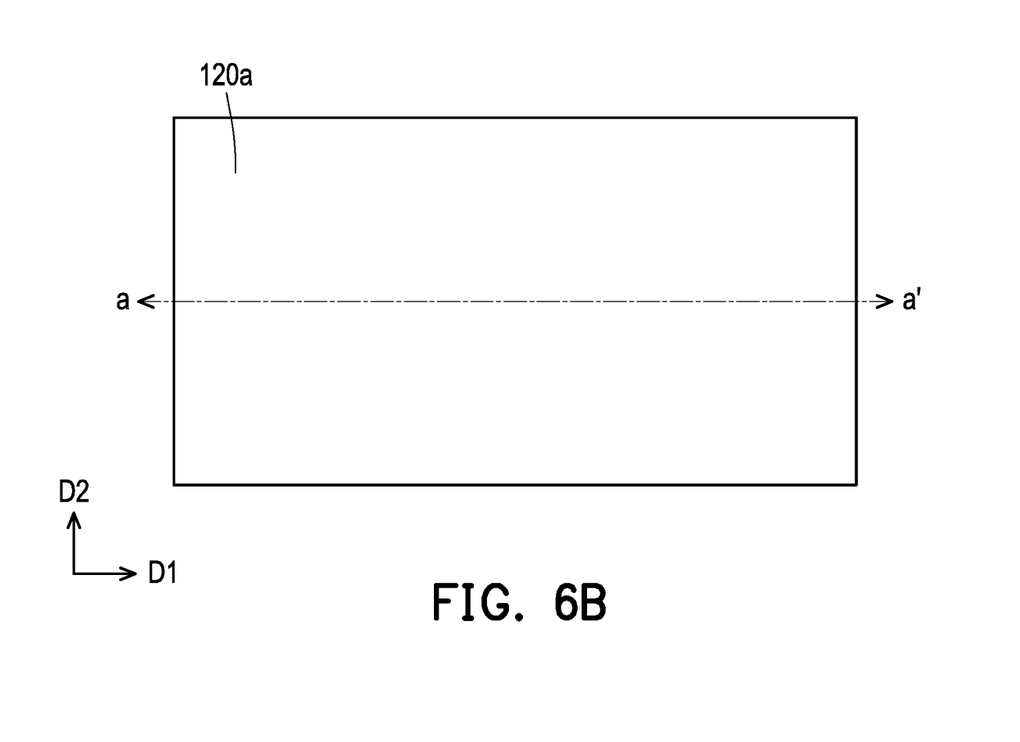

Referring to FIG. 6A and FIG. 6B, an insulation material layer 120a is formed on the semiconductor layer 110. In some embodiments, the insulation material layer 120a includes silicon oxide, silicon nitride, silicon oxynitride, or other suitable materials.

In some embodiments, hydrogen element is included in the insulation material layer 120a, and an annealing process is performed on the semiconductor layer 110 and the insulation material layer 120a, so that the hydrogen element in the insulation material layer 120a is diffused to the semiconductor layer 110, thereby repairing the damage of semiconductor layer 110 generated during the doping process. In some embodiments, the aforementioned annealing process is heating the semiconductor layer 110 and the insulating material layer 120a to a temperature of 400 degrees Celsius to 625 degrees Celsius by a rapid thermal annealing process.

Figure 7A:
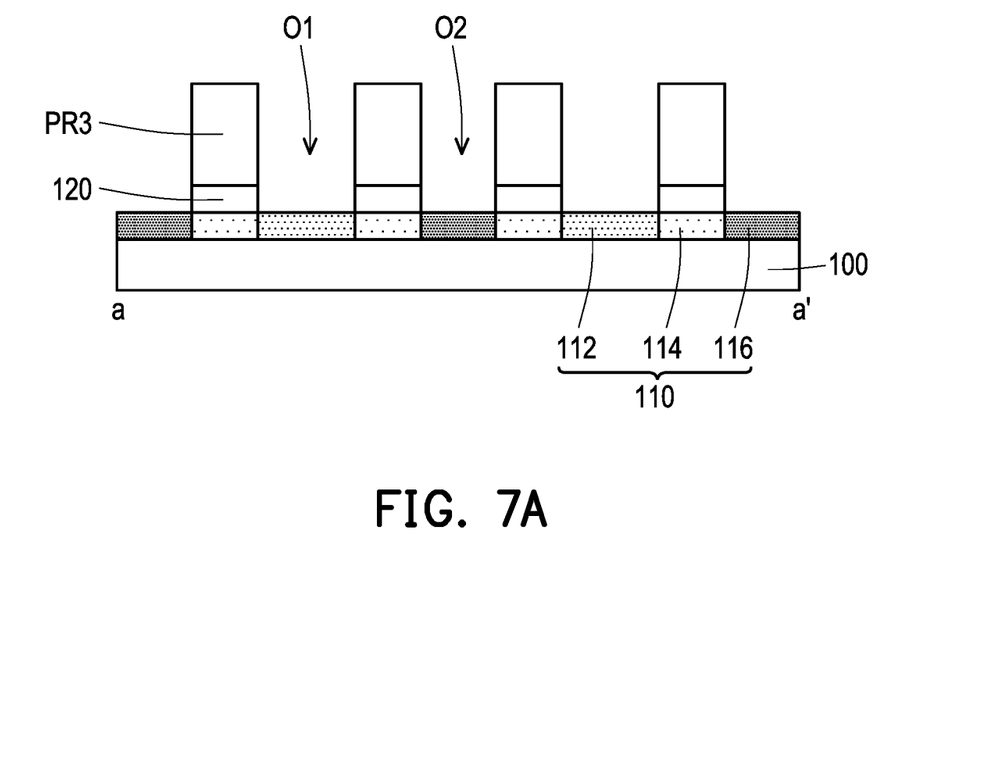
Figure 7B:
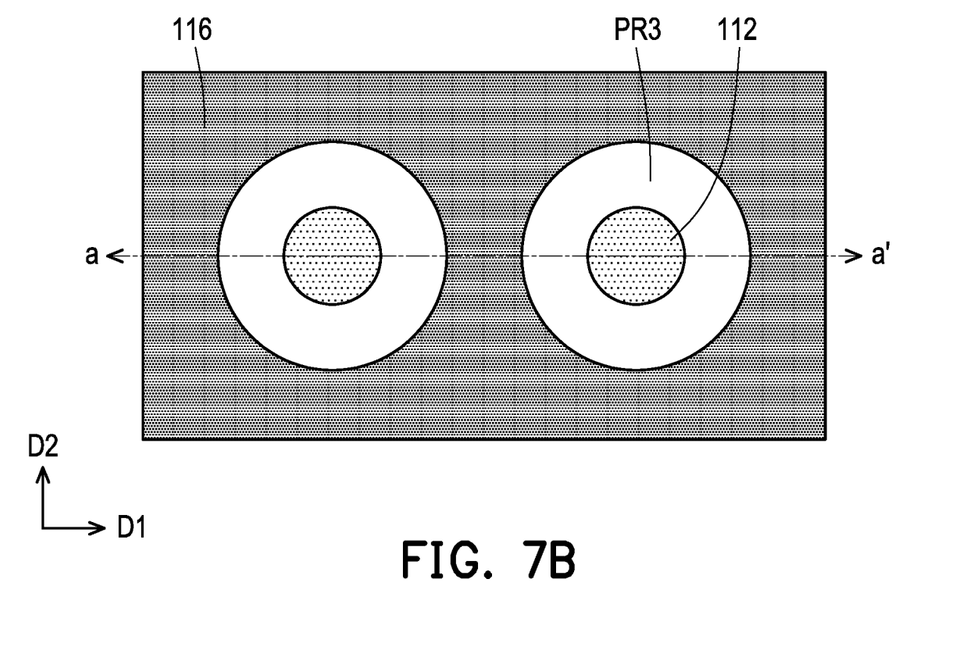

Referring to FIG. 7A and FIG. 7B, the insulation material layer 120a is patterned to form the insulation layer 120 exposing the first doping regions 112 and the second doping region 116. In this embodiment, a third mask pattern PR3 is formed on the insulation material layer 120a. Using the third mask pattern PR3 as a mask, the insulation material layer 120a is etched to form the insulation layer 120 including the openings O1 and O2. The openings O1 of the insulation layer 120 expose the first doping regions 112, and the opening O2 of the insulation layer 120 expose the second doping region 116. In some embodiments, the third mask pattern PR3 is, for example, a patterned photoresist.

In some embodiments, after the insulation material layer 120a is patterned, the third mask pattern PR3 is removed. In some embodiments, the third mask pattern PR3 is removed by etching (e.g., ashing).

Figure 8A:
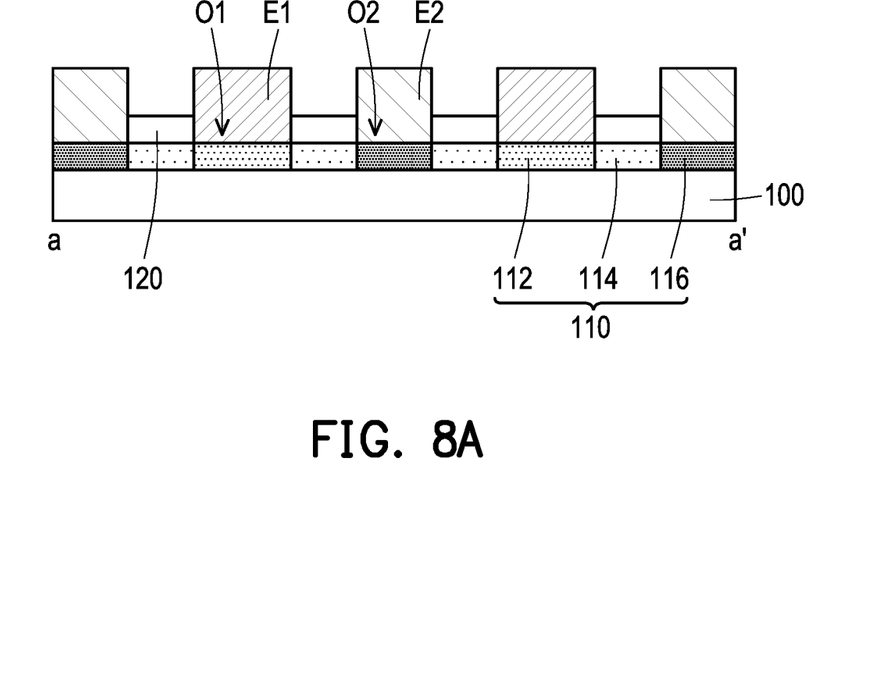
Figure 8B:
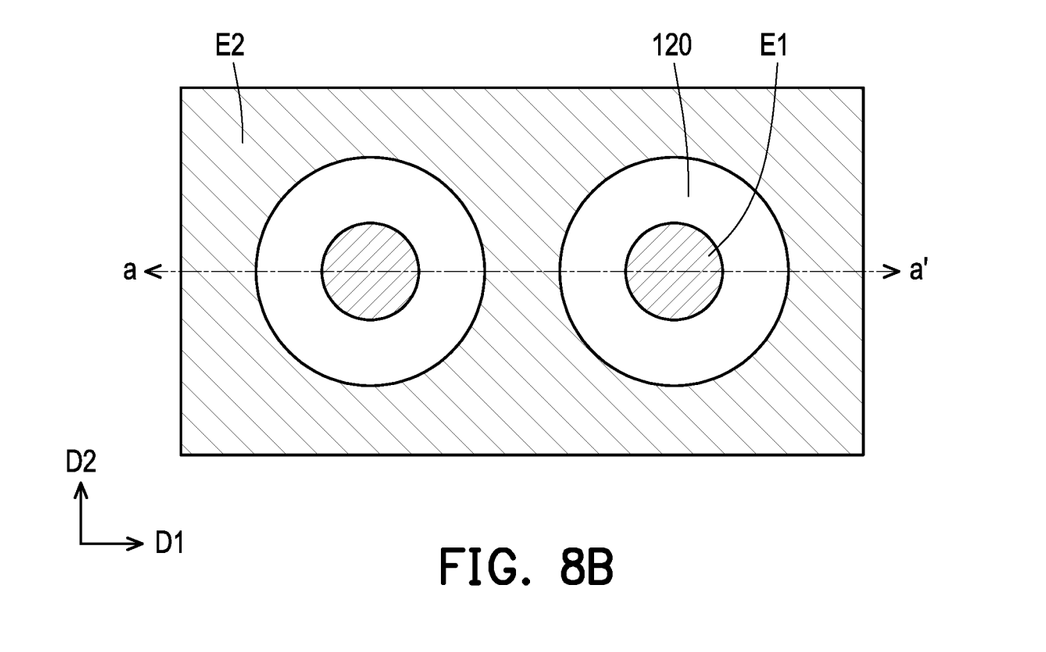

Referring to FIG. 8A and FIG. 8B, the first electrodes E1 are formed on the first doping regions 112, and a second electrode E2 is formed on the second doping region 116. In some embodiments, the first electrodes E1 and the second electrode E2 belong to the same conductive film layer. For example, the method for forming the first electrodes E1 and the second electrode E2 includes: forming a conductive material layer on the insulation layer 120, and filling the conductive material layer into the openings O1 and O2 of the insulation layer 120, and then patterning the conductive material layer material layer to form the first electrodes E1 and the second electrode E2 which are separated from each other.

Figure 9A:
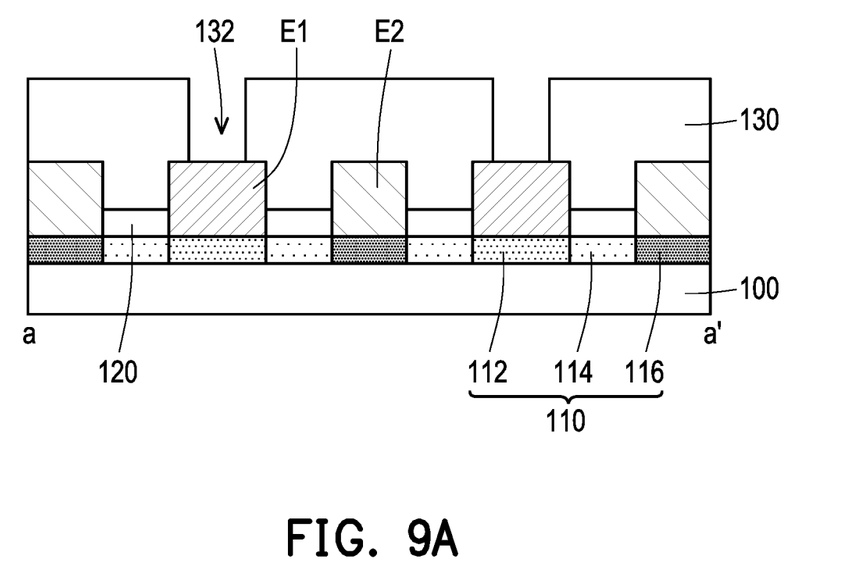
Figure 9B:
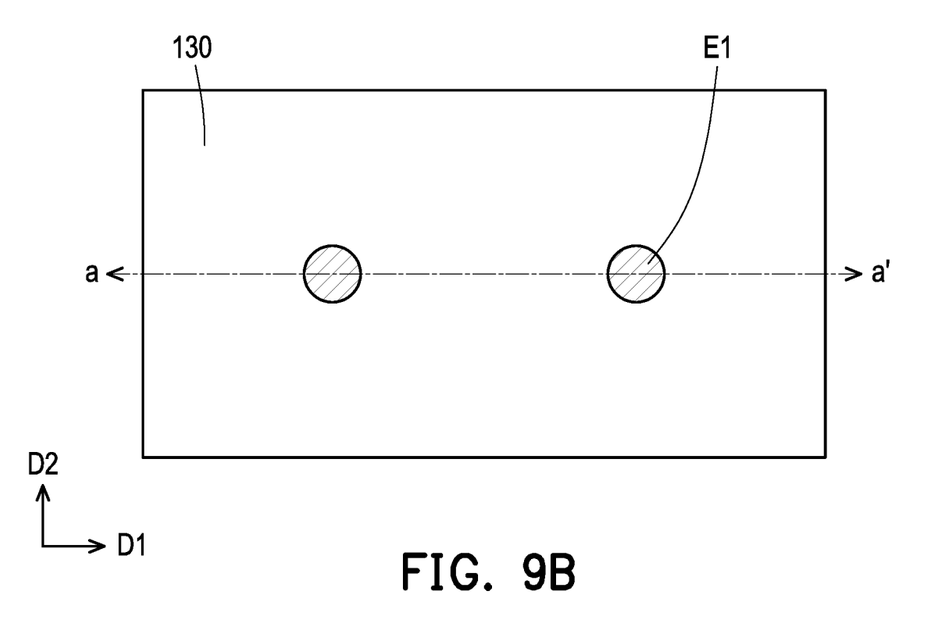

Referring to FIG. 9A and FIG. 9B, a dielectric layer 130 is formed on the semiconductor layer 110. In this embodiment, the dielectric layer 130 is formed on a part of the first electrodes E1, the second electrode E2 and the insulation layer 120. The dielectric layer 130 has first through holes 132 overlapping the first electrodes E1, and the dielectric layer 130 covers the top surface of the second electrode E2.

Figure 10:
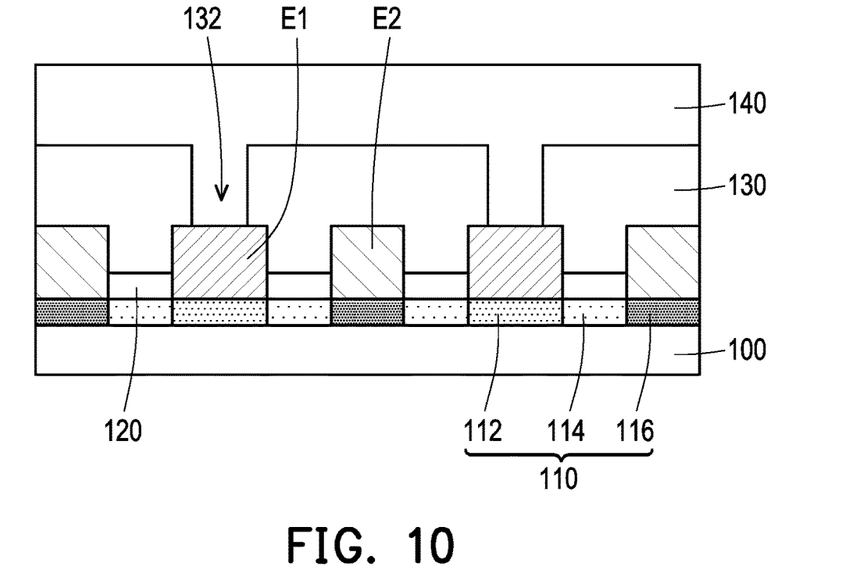

Referring to FIG. 10, a protection adhesive layer 140 is formed above the dielectric layer 130. In some embodiments, the protection adhesive layer 140 is filled in the first through holes 132 of the dielectric layer 130. In some embodiments, the protection adhesive layer 140 includes peelable adhesive.

Figure 11:
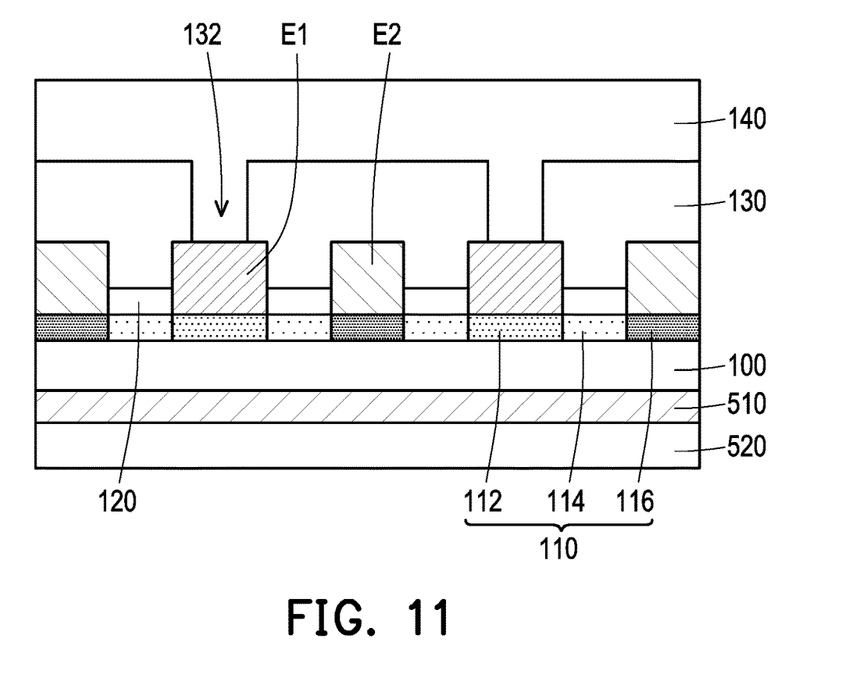

Referring to FIG. 11, a reflective layer 510 is formed on the side of the transparent substrate 100 opposite to the semiconductor layer 110. Then, a protection layer 520 is formed on the reflective layer 510. For example, the reflective layer 510 is formed on the transparent substrate 100 over the entire surface, but the present invention is not limited thereto. In some embodiments, the reflective layer 510 is a patterned film layer.

Figure 12:
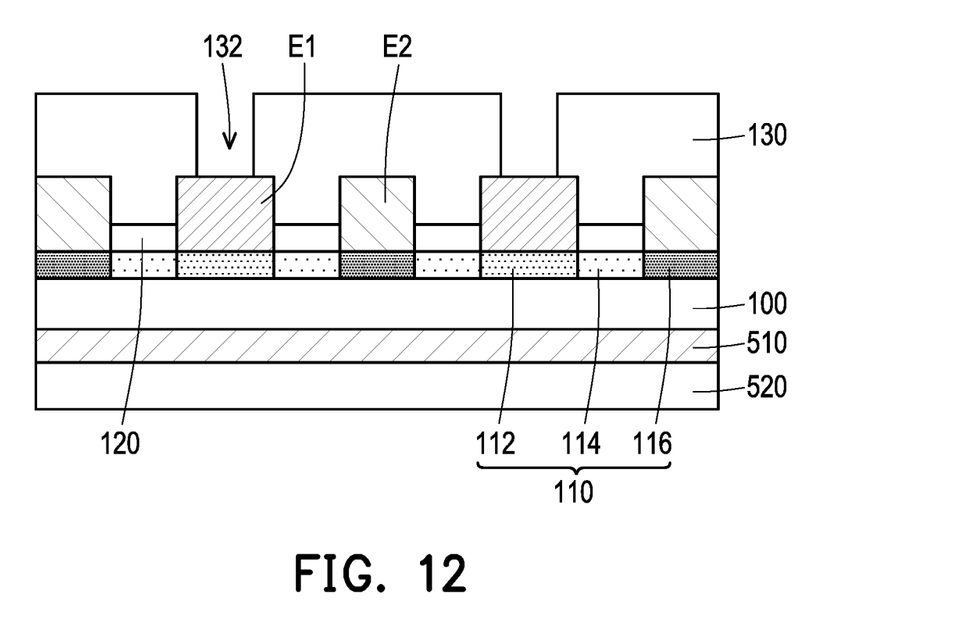

Referring to FIG. 12, the protection adhesive layer 140 is removed. After removing the protection adhesive layer 140, the counter electrode 400 overlapping the first electrodes E1 is provided; the buffer solution 200 is provided between the counter electrode 400 and the first electrodes E1 and between the counter electrode 400 and the dielectric layer 130; and a plurality of particles 300 are provided in the buffer solution 200, as shown in FIG. 1B. So far, the optical tweezer device 10 is substantially completed.

Figure 13A:
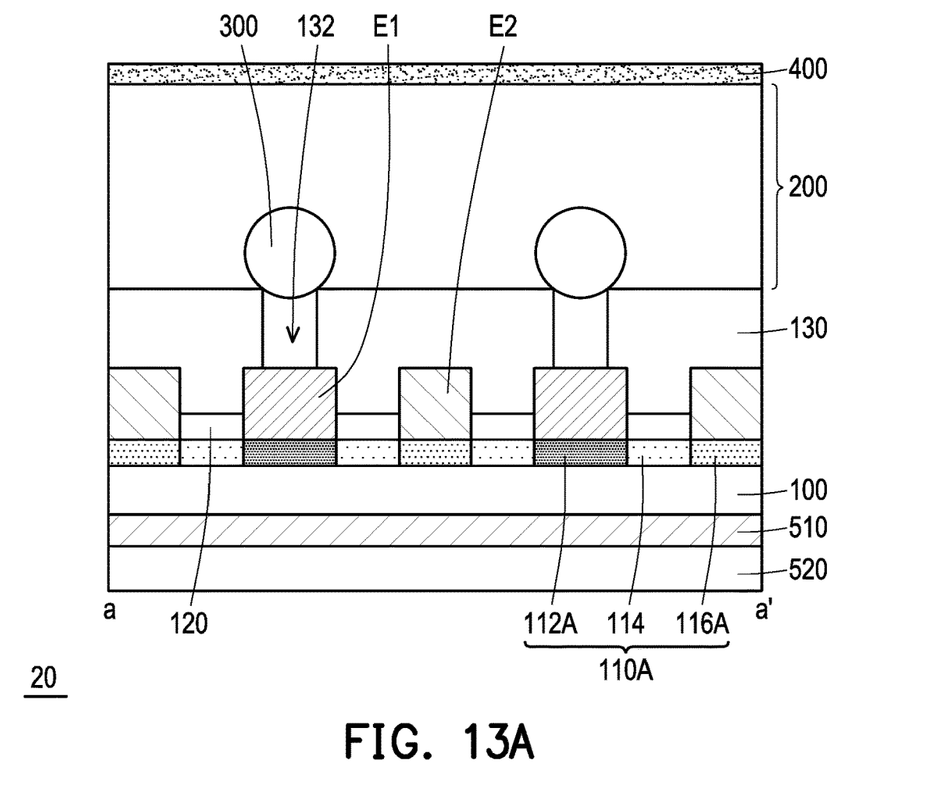
FIG. 13A is a schematic cross-sectional view of an optical tweezer device according to an embodiment of the present invention.
Figure 13B:
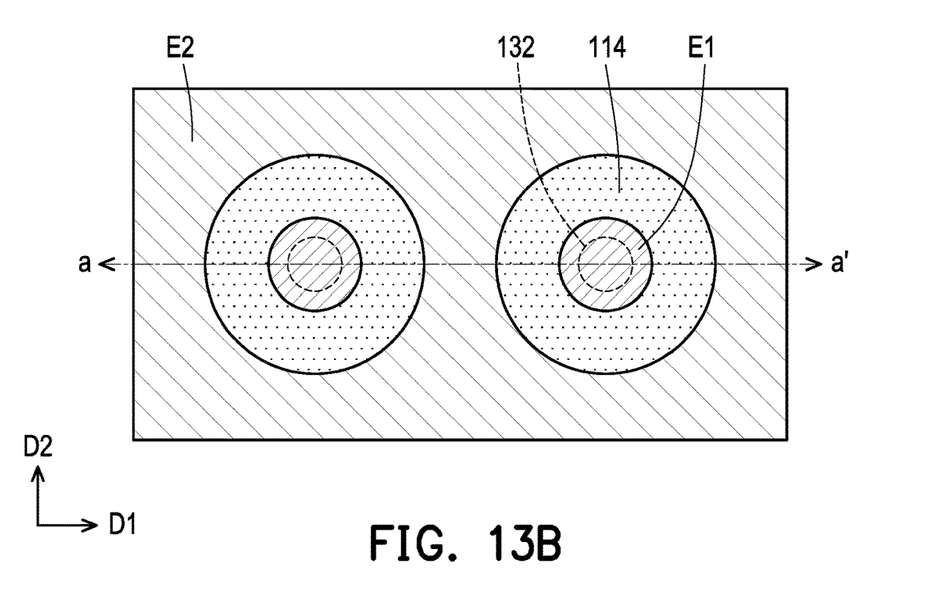
FIG. 13B is a schematic top view of the optical tweezer device of FIG. 13A.

FIG. 13A is a schematic cross-sectional view of an optical tweezer device according to an embodiment of the present invention. FIG. 13B is a schematic top view of the optical tweezer device of FIG. 13A. It should be noted herein that, in embodiments provided in FIG. 13A and FIG. 13B, element numerals and partial content of the embodiments provided in FIG. 1A, FIG. 1B and FIG. 2 are followed, the same or similar reference numerals being used to represent the same or similar elements, and description of the same technical content being omitted. For a description of an omitted part, reference may be made to the foregoing embodiment, and the descriptions thereof are omitted herein.

The difference between the optical tweezer device 20 of FIG. 13A and FIG. 13B and the optical tweezer device 10 of FIG. 1A and FIG. 1B is that: the positions of the N-type semiconductor and the P-type semiconductor in the semiconductor layer 110 of the optical tweezer device 10 are different from the positions of the N-type semiconductor and the P-type semiconductor in the semiconductor layer 110A of the optical tweezer device 20. The first doping regions 112 and the second doping region 116 in the semiconductor layer 110 of the optical tweezer device 10 are N-type semiconductors and a P-type semiconductor respectively, while the first doping regions 112A and the second doping region 116A in the semiconductor layer 110A of the optical tweezer device 20 are P-type semiconductors and an N-type semiconductor respectively.

In the embodiments of FIG. 13A and FIG. 13B, the first electrodes E1 are electrically connected to the P-type semiconductors, and the second electrode E2 is electrically connected to the N-type semiconductor. In this embodiment, the surface of the induced polarized particles 300 is positively charged.

Figure 14A:
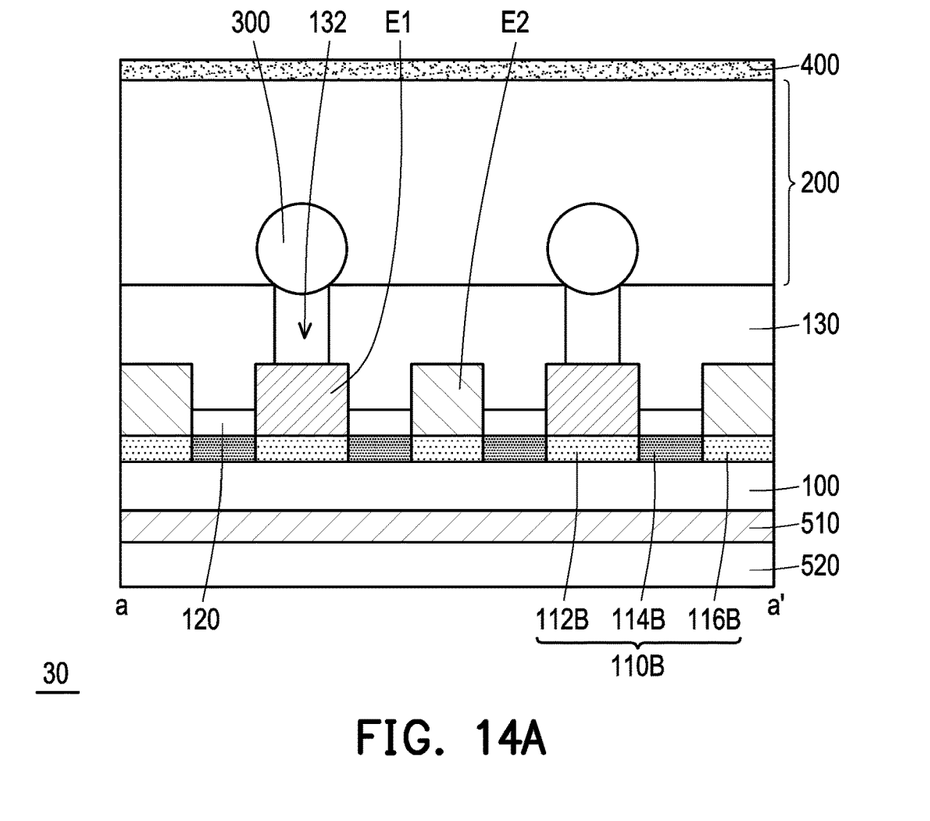
FIG. 14A is a schematic cross-sectional view of an optical tweezer device according to an embodiment of the present invention.
Figure 14B:
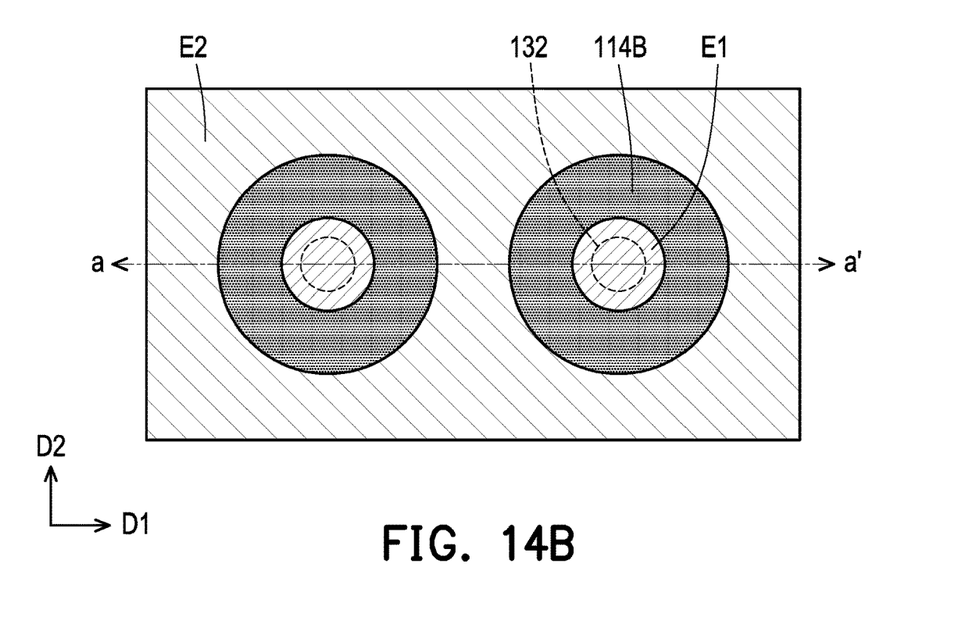
FIG. 14B is a schematic top view of the optical tweezer device of FIG. 14A.

FIG. 14A is a schematic cross-sectional view of an optical tweezer device according to an embodiment of the present invention. FIG. 14B is a schematic top view of the optical tweezer device of FIG. 14A. It should be noted herein that, in embodiments provided in FIG. 14A and FIG. 14B, element numerals and partial content of the embodiments provided in FIG. 1A, FIG. 1B and FIG. 2 are followed, the same or similar reference numerals being used to represent the same or similar elements, and description of the same technical content being omitted. For a description of an omitted part, reference may be made to the foregoing embodiment, and the descriptions thereof are omitted herein.

The difference between the optical tweezer device 30 of FIG. 14A and FIG. 14B and the optical tweezer device 10 of FIG. 1A and FIG. 1B is that: the semiconductor layer 110 of the optical tweezer device 10 includes PIN diodes, while the semiconductor layer 110B of the optical tweezer device 20 includes PN diodes.

In the embodiment of FIG. 14A and FIG. 14B, the first doping regions 112B and the second doping region 116B in the semiconductor layer 110B are N-type semiconductors, and the transition regions 114B are P-type semiconductor. In the embodiment shown in FIG. 14A and FIG. 14B, the first electrodes E1 and the second electrode E2 are both electrically connected to the N-type semiconductors.

In this embodiment, when the light beam is irradiated to the PN diode, the PN diode will generate a photocurrent, thereby attracting or repelling the particles 300.

Figure 15A:
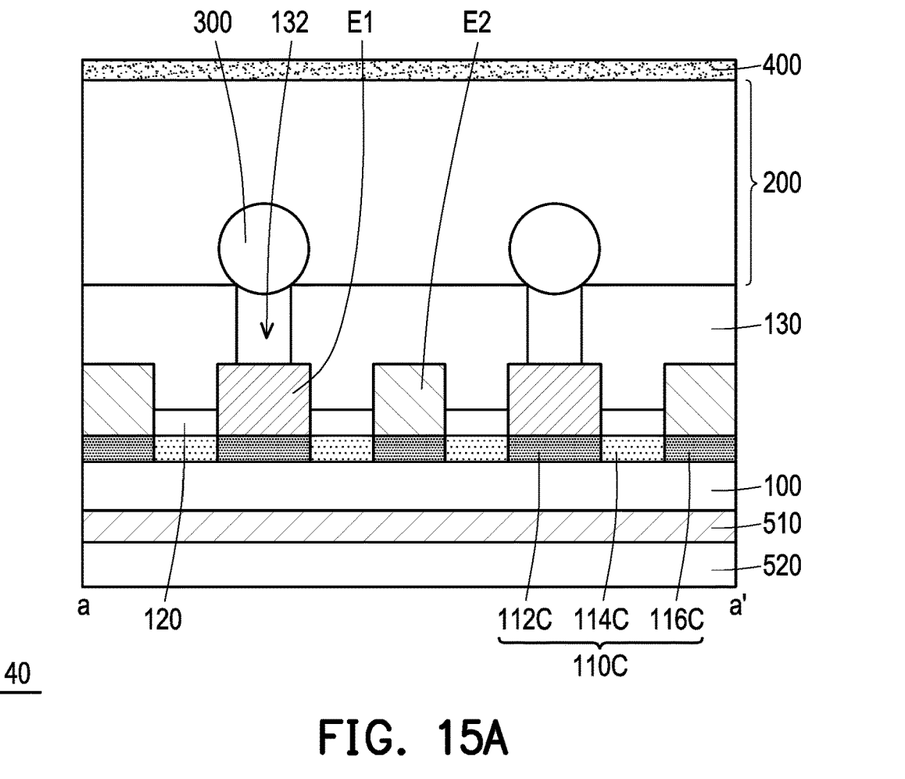
FIG. 15A is a schematic cross-sectional view of an optical tweezer device according to an embodiment of the present invention.
Figure 15B:
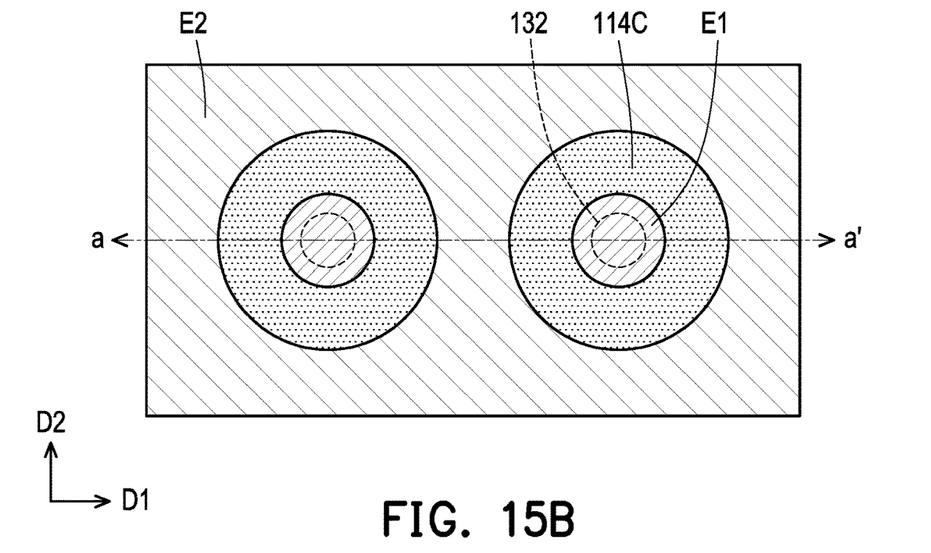
FIG. 15B is a schematic top view of the optical tweezer device of FIG. 15A.

FIG. 15A is a schematic cross-sectional view of an optical tweezer device according to an embodiment of the present invention. FIG. 15B is a schematic top view of the optical tweezer device of FIG. 15A. It should be noted herein that, in embodiments provided in FIG. 15A and FIG. 15B, element numerals and partial content of the embodiments provided in FIG. 1A, FIG. 1B and FIG. 2 are followed, the same or similar reference numerals being used to represent the same or similar elements, and description of the same technical content being omitted. For a description of an omitted part, reference may be made to the foregoing embodiment, and the descriptions thereof are omitted herein.

The difference between the optical tweezer device 40 of FIG. 15A and FIG. 15B and the optical tweezer device 10 of FIG. 1A and FIG. 1B is that: the semiconductor layer 110 of the optical tweezer device 10 includes PIN diodes, while the semiconductor layer 110C of the optical tweezer device 40 includes PN diodes.

In the embodiment of FIG. 15A and FIG. 15B, the first doping regions 112C and the second doping region 116C in the semiconductor layer 110C are P-type semiconductors, and the transition regions 114C are N-type semiconductors. In the embodiment shown in FIG. 15A and FIG. 15B, the first electrodes E1 and the second electrode E2 are both electrically connected to the P-type semiconductors.

In this embodiment, when the light beam is irradiated to the PN diode, the PN diode will generate a photocurrent, thereby attracting or repelling the particles 300.

What is claimed is:

1. An optical tweezer device, comprising:
   a transparent substrate;
   a semiconductor layer, located above the transparent substrate and comprising a first doping region, a second doping region and a transition region, wherein the transition region is located between the first doping region and the second doping region;
   a first electrode, located on the first doping region and electrically connected to the first doping region; and
   a dielectric layer, located above the semiconductor layer and having a first through hole overlapping the first electrode.

2. The optical tweezer device of claim 1, further comprises:
   a second electrode, located on the second doping region and electrically connected to the second doping region.

3. The optical tweezer device of claim 2, wherein the first electrode is an island-shaped structure, and the second electrode surrounds the first electrode.

4. The optical tweezer device of claim 2, wherein the dielectric layer covers a top surface of the second electrode.

5. The optical tweezer device of claim 1, wherein the second doping region surrounds the transition region.

6. The optical tweezer device of claim 1, wherein one of the first doping region and the second doping region is a P-type semiconductor, another of the first doping region and the second doping region is an N-type semiconductor, and the transition region is an intrinsic semiconductor or a lightly doped semiconductor which has a purity close to the intrinsic semiconductor.

7. The optical tweezer device of claim 1, wherein the first doping region and the second doping region are P-type semiconductors, and the transition region is an N-type semiconductor or a lightly doped semiconductor which has a purity close to an intrinsic semiconductor.

8. The optical tweezer device of claim 1, wherein the first doping region and the second doping region are N-type semiconductors, and the transition region is a P-type semiconductor or a lightly doped semiconductor which has a purity close to an intrinsic semiconductor.

9. The optical tweezer device of claim 1, further comprises:
   a reflective layer, wherein the transparent substrate is located between the reflective layer and the semiconductor layer.

10. The optical tweezer device of claim 1, further comprises:
    an insulation layer, located between the dielectric layer and the semiconductor layer;
    a counter electrode overlapping the first electrode;
    a buffer solution, located between the counter electrode and the first electrode; and
    a plurality of particles, located in the buffer solution.

* * * * *